June 22, 1926.
L. W. WHITMORE
1,589,916
AUXILIARY CARRIER FOR VEHICLES
Filed May 28, 1924
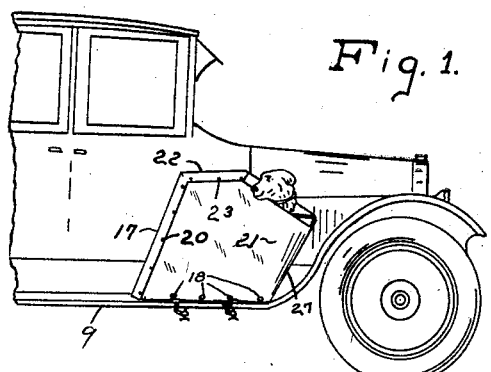
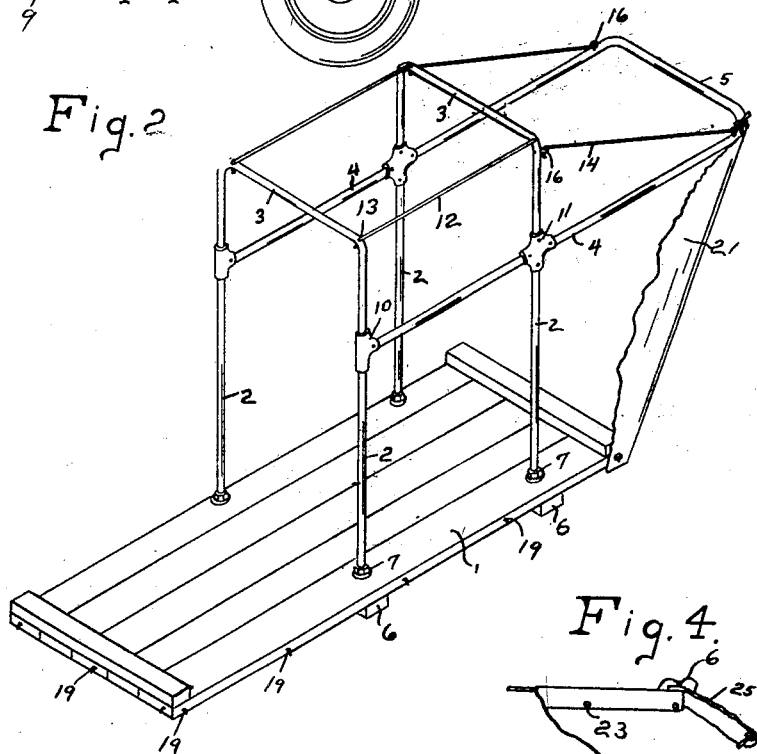
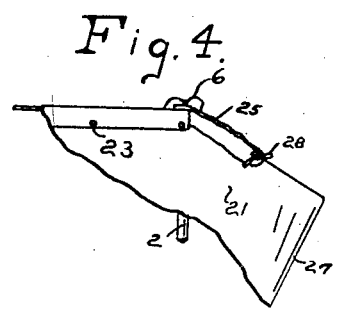
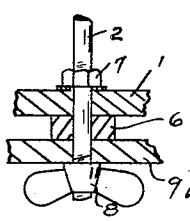
INVENTOR.
Leonard W. Whitmore.
BY Erwin, Wheeler & Woolard
ATTORNEYS Patented June 22, 1926.

1,589,916

UNITED STATES PATENT OFFICE.

LEONARD W. WHITMORE, OF MENASHA, WISCONSIN.

AUXILIARY CARRIER FOR VEHICLES.

Application filed May 28, 1924. Serial No. 716,349.

My invention relates to improvements in auxiliary carriers for vehicles.

The object of my invention is to provide means for carrying domestic animals, such as dogs, exterior to the vehicle body and preferably on the step.

More particularly stated, it is the primary object of my invention to provide detachable means for comfortably housing a dog upon the step of an automobile, securing the animal within the housing but allowing an exposure of his head if desired, and also allowing sufficient freedom of movement to enable him to either stand or lie within the enclosure.

A further object is to provide a motor driven vehicle with a suitable dog cage of simple inexpensive structure and light weight, the same being composed of a set of frame rods covered, in whole or in part, by a set of canvas walls.

In the drawings:—

Figure 1 is a side view of a motor driven vehicle to which my improved dog carrier or cage has been attached.

Figure 2 is a detail view of the cage frame.

Figure 3 is a detail view, showing one means for clamping the device to a vehicle step.

Figure 4 is a detail view in side elevation, showing means for varying the size of the head opening.

Like parts are identified by the same reference characters throughout the several views.

The cage frame comprises floor 1, a set of posts 2, upper cross bars 3, side bars 4 and front cross bar 5. The posts 2 may pass through the floor 1 and its supporting sills 6 and may be conveniently secured to the floor and sills by upper and lower clamping units 7 and 8 respectively. If desired, the bolts may also pass through the vehicle step and the nuts 8 applied to the under side, as shown in Figure 3, whereby the cage may be clamped to the step. But if it is not desired to have holes in the step for this purpose, ordinary C clamps may be used to hold the cage to the step 9.

The posts 2 and cross bars 3 may be formed of bent rods or pieces of tubing, each cross bar 3 comprising the central portion of a rod or tube, the end portions of which constitute a connected pair of posts. The side bars 4 and front cross bar 5 may be similarly formed, and the side bars may be secured to the posts by ordinary coupling clamps 10 and 11. Link rods 12 or strands of wire may connect the bars 3, these rods having elbowed extremities 13 fitted in suitable sockets or holes in the bars 3. Similar link rods 14 connect the forward bar 3 with the cross bar 5, the latter being preferably in a lower plane. These link rods are preferably coupled to the cross bars by eye pieces 16 having shanks riveted to the bars.

A canvas wall 17 extends from the rear cross bar 3 downwardly and rearwardly to the rear end of the floor 1 which extends rearwardly from the rear posts 2. Any suitable fasteners may be employed, but preferably the canvas is provided with metal eyelets 18 adapted to receive hooks 19 connected with the floor and cross bar respectively. Canvas side walls 21 are secured to the wall 17 by snap fasteners 20 or other suitable means of connection, and these walls are also connected by suitable fastenings with the links 14 and to the front corners of the floor. A canvas top wall 22 also spans the space between the cross bars 3 and is secured to the side walls by snap fasteners 23. A folding flap 25 may also be secured to the front cross bar 3 and detachably connected with the cross bar 5 by straps 6, which may be used to connect the flap with the rear cross bar 3 when the flap is in open position. The front wall 27 is also of canvas similarly secured in position. Where the carrier is located adjacent to the front fender, this wall is not essential for the purpose of confining the animal, but it is desirable as a means to prevent the animal from scratching the fender.

With the above described construction, it is obvious that the animal may be wholly enclosed if desired, since the foraminous walls allow adequate ventilation. The top walls, however, may be made of water proof material. But under ordinary conditions, the flap 25 may be opened. The openings covered by this flap are too small to allow the body of the animal to pass. If it is desired to vary the size of this head opening, the flap 25 may be secured to the side walls by intermediate fastenings 28 which cannot be released by any pressure exerted by the animal. The frame posts 2 occupy but little space, and need not interfere with the swinging movements of the car doors. But the inclined extensions of the canvas walls to the front and rear provide ample room for the animal. The forward extension may project over the front fender to occupy space that cannot well be used for other purposes.

I claim:

1. An animal carrier for vehicles, comprising the combination of a set of posts, bars connecting the upper portions of the posts with each other and extending in one direction beyond the space enclosed by the posts, securing devices for connecting the posts to a vehicle, and a covering for the space defined by the posts and bars.

2. An animal carrier for vehicles, comprising the combination of a set of posts, bars connecting the upper portions of the posts with each other and extending in one direction beyond the space enclosed by the posts, securing devices for connecting the posts to a vehicle, and a covering for the space defined by the posts and bars, said covering being releasable in part to allow an animal's head to project from the enclosure.

3. An animal carrier for vehicles having a step and front fender, said carrier comprising a base adapted to be secured to the step, posts connected with the forward portion of the base, frame members secured to the posts and projecting forwardly thereof and adapted to extend over the rear portion of said fender, and a covering connected with the posts and frame member and extending downwardly therefrom to the ends and sides of the base.

4. An animal carrier for vehicles having a step and a front fender, said carrier comprising a base adapted to be secured to the step, posts connected with the forward portion of the base, frame members secured to the posts and projecting forwardly thereof and adapted to extend above the rear portion of said fender, and a covering connected with the posts and frame members and extending downwardly therefrom to the ends and sides of the base, said covering being inclined over the space in front and rear of the posts.

5. An animal carrier for vehicles, comprising the combination of pairs of posts, cross bars connecting the upper end of each pair with each other, side bars connecting the pairs of posts below their upper ends on each side and extending in one direction beyond the space between said pairs of posts, a cross bar connecting the outer ends of the side bars, stays above the side bars connecting the pairs of posts with each other, inclined stays connecting one pair of posts with the projecting end portions of the side bars; and a flexible covering adapted to be secured over said posts, cross bars, and side bars to form an enclosure, and provided with a foldable flap adapted to provide an opening between said inclined stays through which the head of an animal may project.

LEONARD W. WHITMORE.